Nov. 23, 1971  A. R. PUCCINELLI  3,621,714

ICE DETECTOR MEANS

Filed May 13, 1969

INVENTOR.
ALFRED R. PUCCINELLI

United States Patent Office 3,621,714
Patented Nov. 23, 1971

3,621,714
ICE DETECTOR MEANS
Alfred R. Puccinelli, 36 Bay Drive E.,
Huntington, N.Y. 11743
Filed May 13, 1969, Ser. No. 824,217
Int. Cl. B64d 15/20; G01w 1/00
U.S. Cl. 73—170                                1 Claim

ABSTRACT OF THE DISCLOSURE

An ice detector probe is mounted on the test surface. The probe contains a radiation source and a radiation detector. Ice forming on the probe will cut off the radiation to the detector. Icing rate is detected by automatically heating and de-icing the detector when the ice forms. The required repetitive heating cycle is counted over a period of time to provide an indication of icing rate.

BACKGROUND OF THE INVENTION

Figure 2:
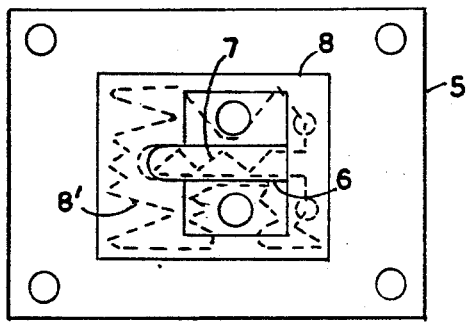

This invention relates to ice and smoke detecting means and more particularly, to means for detecting icing conditions in a carburetor or on a surface.

More particularly, the invention relates also to means for retecting the rate of icing.

It is well known that ice forms readily in the carburetor systems of internal combustion engines and it is also well known that in helicopters and airplanes this reduces or cuts the engine power and creates a very hazardous condition. Ice may be formed in the carburetor by several different processes, for instance sleet, snow and supercooled rain, or saturated or moist air may cause the formation of ice in a carburetor or on other surfaces of an aircraft.

Ice is also formed in a carburetor when the outside air temperature is above freezing and the relative humidity is high. It is also formed in a carburetor system by fuel evaporation after the fuel is introduced into the air stream, which causes moisture to condense and freeze on the inside walls of the carburetor.

The result of ice forming in a carburetor is the reduction of engine power and results in a hazardous condition. It is, therefore, very important that icing conditions be readily and quickly detected. Icing on wings or control surfaces can also be detected by the present invention. It may also be used to detect smoke or fluid.

It is very important to detect the rate of icing, especially on aircraft wing surfaces, since an immediate application of de-icing means, or change of altitude or direction might be indicated.

This invention is an improvement of my prior Pat. No. 3,268,883 for Ice Detector Means, granted Aug. 23, 1966.

Accordingly, a principal object of the invention is to provide new and improved means for detecting icing and icing rate.

Another object of the invention is to provide new and improved means for detecting icing in carburetors in internal combustion engines.

Another object of the invention is to provide new and improved means for detecting icing in aircraft carburetors.

Another object of the invention is to provide new and improved means for detecting icing on aircraft or other surfaces and in air ducts.

Another object of the invention is to detect smoke due to fire or the presence of liquids.

Another object of the invention is to provide new and improved surface ice detecting means comprising a unitary assembly adapted to be mounted through a hole in a solid surface wall, said unitary assembly comprising a body member, radiation source means, radiation detector means, said assembly including extension member means fixedly connected to the body member, said extenison member extending generally parallel to the radiation axis between said source and said detector, one of said detector means being mounted on said extension member and along said radiation axis and said radiation means being mounted in said body member, means to mount said detector means in predetermined space relation to said radiation source means with one of said detector means in the airstream over said surface so that said assembly may be preset and installed on a unit whereby formation of ice on said detector means reduces radiation to said detector and cauess said detector to activate warning means, and icing rate measuring means comprising deicing heater means mounted in heat transfer relation to said detector means mounted on said extension, means to energize said heater in response to ice forming on said extension member to melt said ice, means to de-energize said heater when said ice is melted, whereby said heater on-off cycle is proportional to icing rate, and means to count said heater cycles over a period of time.

Figure 1:
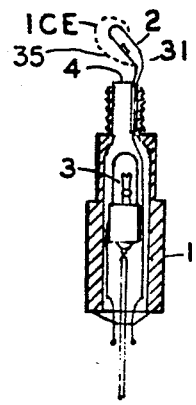
Figure 3:
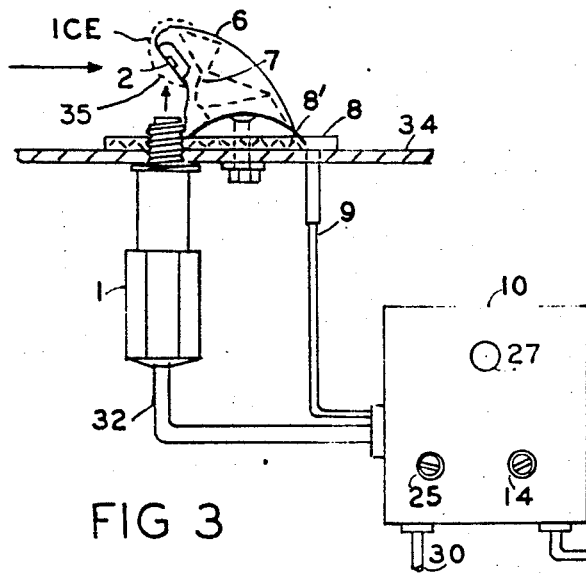
Figure 4:
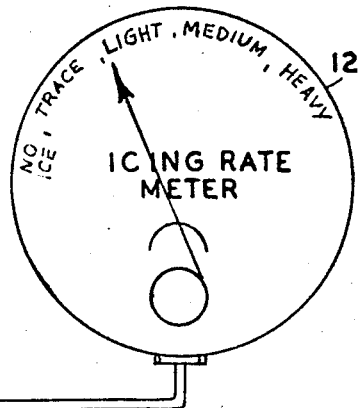
Figure 4:
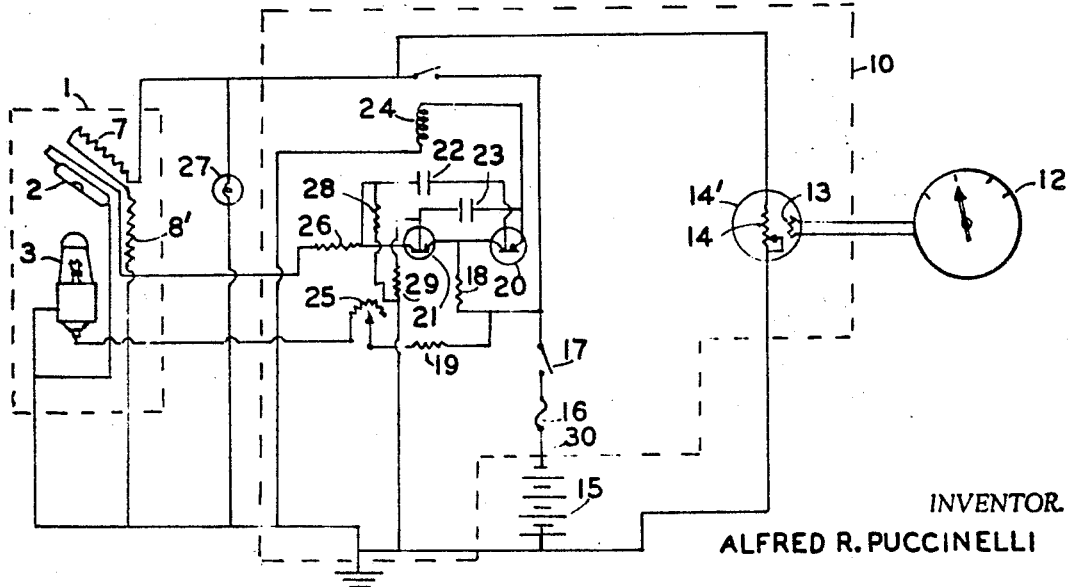

These and other objects of the invention will be apparent from the following specification and drawings, of which:

FIG. 1 is a sectional view of a probe.
FIG. 2 is a top view of an embodiment of the invention.
FIG. 3 is a side view partly in section of FIG. 2 and associated components.
FIG. 4 is a schematic circuit diagram.

The present invention generally provides a probe which may be inserted in a tapped hole in the wall of a carburetor throat. The probe incorporates a radiation source and a solid state light sensitive electric detector switch which is mounted at the end of the probe so that it receives the light through a predetermined path from the light source. The switch will conduct an electric current in the presence of light from the light source. However, if ice or frost is built up to a predetermined amount on the wall of the carburetor in the light path between the light source and the switch in the probe, then the switch will not conduct current and suitable warning devices are activated, and the icing rate will be indicated.

Referring to FIG. 1, the probe, for best efficiency sensitivity and reaction time should be in the airstream, and comprises a body member 1 which contains a light or other radiation source 3 which is adapted to direct a path of light or radiation to a light or radiation sensitive switch or photocell 2 which is mounted at the end 31 of the probe member. The light path passes through a Plexiglas or glass window 4 which terminates within the wall surface. The radiation source is connected to a power source. The other two wires of cable 32 are connected to the switch or cell 2.

The light switch is a small conventional silicon semi-conductor switch or photocell, for instance, type International Rectifier Co. SL 1S1 or General Electric ZJ227U which is adapted to conduct in the presence of the light path. Conventional photocells may also be suitable for the present purpose. The device must be very small and be able to withstand extreme temperature variation and vibration loads and shock. The radiation switch may also be capable of activating a relay directly without the need for means to amplify the electrical power. The radiation switch is also sealed and impervious to gasoline, oil, etc.

The level of the illumination is carefully adjusted so that when ice 35 starts to form on the inside wall and probe of the carburetor, as shown by the dotted lines, the radiation path will be reduced or cut off and the switch will activate suitable warning devices which may be a red warning light.

FIGS. 2 and 3 show an embodiment of the invention, FIG. 2 being a top view. The probe 1 is mounted in a threaded hole or bolted to the test surface 34 with the detector 2 extending into the air stream. In order to detect the rate of icing, it is necessary to de-ice the detector. For this purpose, a hood or heat shield 6 is mounted on a base plate 8. The hood 6 covers the top and sides of the detector 2 and the hood has a plurality of heating wires 7 which are used for de-icing the detector. The base 8 also has a heating element 8' which is also used for de-icing the detector. The heating power on the lead 9 is provided from the control unit 10 and the detector is also connected to the control unit 10. The output of the control unit 10 is connected to the icing rate meter 12, which will indicate the rate of icing such as a "trace," "light," "medium," or "heavy," or some other quantity. The meter is calibrated, as will be described. A warning light 27 also indicates the presence of ice.

The system may indicate the rate at which ice is forming on the probe with a meter reading "no ice," "trace ice," "light ice," "medium ice," "heavy ice." This is accomplished by adding the de-icing heater 7 to the basic probe. When frost first forms on the detector of the probe it is detected immediately and the warning system is activated. At the same time as the warning light comes on, the heater is activated to immediately de-ice the probe. Due to the very small size of the probe the de-icing takes place in a very short period of time. The frost is then melted off the detector and the red light and probe heater go off. If icing continues, the above procedure is repeated as often as the ice continues to build up. This produces a cycling of the heater on and off, depending on the icing rate, the heavier the icing, the more the cycling of the heater.

Another small heater 14 is connected to the probe heater circuit and this heater installed in a small oven 14'; then the temperature of the oven will be proportional to the number of icing cycles. The temperature of the oven is measured with a thermocouple 13 connected to a meter 12 which instead of reading temperature is calibrated in "no ice," "trace ice," "light ice," "medium ice" and "heavy ice"; we then have an icing rate meter.

The meter can be calibrated to read the amount of water content for each division of "trace," "light," "medium" or "heavy" by varying the amount of radiation in the probe radiator (lamp) and/or varying the size of the heater in the oven and/or varying the amount of oven insulation and/or ventilation. The amount of heat at the probe heater may also be adjusted to calibrate the meter reading.

More specifically, referring to FIG. 4, power to radiator 3 is provided from battery 15 through fuse 16, power switch 17, resistor 19, potentiometer 25, to the radiator 3 and back to ground.

The detector 2 current goes from ground through detector 2 and resistor 26 to the collector of transistor 21.

The heaters 7 and 8' are connected in series from ground through relay 24 to the power source. Resistor 14 in oven 14' is connected in parallel with the heaters 7 and 8'. Thermocouple 13 measures the temperature in oven 14' and meter 12 measures the current in the thermocouple 13.

The transistor 21 circuit is a flip-flop switching circuit to control the heater relay 24. The detector 2 current is connected to the collector of resistor 21 and its base is connected to ground through resistor 29. Its emitter is connected to the collector of transistor 20. The base of transistor 20 is connected through condenser 22 and resistor 28 to ground. The emitter of transistor 20 is connected to the relay 24 and also through condenser 23 to the base of transisetor 21. The emitter of transistor 21 and the collector of transistor 20 are connected through resistor 18 to the power source.

The operation of the circuit is as follows:

In normal condition, with no ice, there is a current through detector 2 which causes transistor 21 to conduct and transistor 20 is cut off. When the current through detector 2 is interrupted by ice forming on its surface, then transistor 21 is cut off and transistor 20 conducts, which causes relay 24 to close, applying heat to the heaters 7 and 8'.

After the detector has been de-iced the current will again flow in detector 2, turning on transistor 21 and cutting off transistor 20, thereby removing the heat. This cycle will automatically take place and the speed of the cycle is a function of the icing rate. This is measured by means of the resistor 14 which is connected in parallel with heaters 7 and 8'. The heat in oven 14' will be a function of the icing rate which is measured by thermocouple 13 and indicated on meter 12. When the heater is on, warning light 27 is turned on.

What is claimed is:

1. Surface ice detecting means comprising,
   a unitary assembly adapted to be mounted through a hole in a solid surface wall,
   said unitary assembly comprising,
   a body member,
   ice sensitive radiation source means,
   detector means responsive to said radiation,
   said assembly including extension member means fixedly connected to the body member,
   said extension member extending generally parallel to an axis between said source means and said detector means,
   said detector means being mounted on said extension member in a predetermined space relation to the radiation source means with said detector means in an airstream over said surface so that said assembly may be preset and installed on a unit whereby formation of ice on said radiation detector reduces the radiation perceived by said detector means,
   means to cause said detector to activate warning means,
   calibratable icing rate measuring means comprising de-icing heater means mounted in heat transfer relation to said detector means,
   means to energize said heater in response to ice forming on said one means to melt said ice,
   means to de-energize said heater when said ice is melted,
   whereby said heater on-off cycle frequency is proportional to icing rate,
   means to integrate said heater cycles per unit of time,
   indicator means responsive to said integrating means to indicate icing rate, wherein said integrating means is a heat source and oven interacting as a system to provide a temperature proportional to the number of heating cycles,
   said heat source being mounted in said oven, and said indicator is responsive to the integrated temperature in said oven.

References Cited

UNITED STATES PATENTS

| | | | |
|---|---|---|---|
| 2,641,928 | 6/1953 | Howell | 73—170 |
| 2,755,456 | 7/1956 | Bursack | 340—234 |
| 3,268,883 | 8/1966 | Puccinelli | 340—234 |

RICHARD C. QUEISSER, Primary Examiner

M. SMOLLAR, Assistant Examiner

U.S. Cl. X.R.

73—432 CR; 244—134 E